US006963983B2

(12) United States Patent
Munson et al.

(10) Patent No.: US 6,963,983 B2
(45) Date of Patent: *Nov. 8, 2005

(54) METHOD OF AND SYSTEM FOR DETECTING AN ANOMALOUS OPERATION OF A COMPUTER SYSTEM

(75) Inventors: John C. Munson, Moscow, ID (US); Sebastian G. Elbaum, Moscow, ID (US)

(73) Assignee: Cylant, Inc., Lexington, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 10/755,948

(22) Filed: Jan. 13, 2004

(65) Prior Publication Data

US 2004/0143756 A1 Jul. 22, 2004

Related U.S. Application Data

(63) Continuation of application No. 09/309,755, filed on May 11, 1999, now Pat. No. 6,681,331.

(51) Int. Cl.[7] ................................................. G06F 11/30
(52) U.S. Cl. ....................................................... 713/201
(58) Field of Search ................................. 713/200, 201; 709/223, 224; 706/15, 16, 21, 22, 50, 61, 45–48, 62

(56) References Cited

U.S. PATENT DOCUMENTS

| | | | |
|---|---|---|---|
| 5,067,073 A | 11/1991 | Andrews | 395/375 |
| 5,278,901 A | 1/1994 | Shieh et al. | 380/4 |
| 5,313,616 A | 5/1994 | Cline et al. | 395/500 |
| 5,355,487 A | 10/1994 | Keller et al. | 395/650 |
| 5,487,131 A | 1/1996 | Kassatly et al. | 395/62 |

(Continued)

OTHER PUBLICATIONS

Frank, "Artificial Intelligence and Intrusion Detection: Current and Future Directions" Jun. 9, 1994, Division of Computer Science University of California at Davis, p. 1–12.*
"Real –time attach recognition and response: A solution for tightening network security" 1997, Internet Security Systems, p. 1–13.*
Lankiewicz et al, "Real–time Anomaly Detection Using a Nonparametric Pattern Recognition Approach", 1991, IEEE, p. 80–89.*

(Continued)

*Primary Examiner*—Christopher Revak
(74) *Attorney, Agent, or Firm*—David H. Judson

(57) ABSTRACT

A real-time approach for detecting aberrant modes of system behavior induced by abnormal and unauthorized system activities that are indicative of an intrusive, undesired access of the system. This detection methodology is based on behavioral information obtained from a suitably instrumented computer program as it is executing. The theoretical foundation for the present invention is founded on a study of the internal behavior of the software system. As a software system is executing, it expresses a set of its many functionalities as sequential events. Each of these functionalities has a characteristic set of modules that is executed to implement the functionality. These module sets execute with clearly defined and measurable execution profiles, which change as the executed functionalities change. Over time, the normal behavior of the system will be defined by the boundary of the profiles. An attempt to violate the security of the system will result in behavior that is outside the normal activity of the system and thus result in a perturbation of the system in a manner outside the scope of the normal profiles. Such violations are detected by an analysis and comparison of the profiles generated from an instrumented software system against a set of known intrusion profiles and a varying criterion level of potential new intrusion events.

31 Claims, 4 Drawing Sheets

U.S. PATENT DOCUMENTS

| | | | | |
|---|---|---|---|---|
| 5,499,340 | A | | 3/1996 | Barritz ................... 395/184.01 |
| 5,528,753 | A | | 6/1996 | Fortin ..................... 395/183.11 |
| 5,539,907 | A | | 7/1996 | Srivastava et al. ........... 395/700 |
| 5,557,742 | A | | 9/1996 | Smaha et al. ............... 395/186 |
| 5,581,482 | A | | 12/1996 | Wiedenman et al. ... 364/551.01 |
| 5,621,889 | A | | 4/1997 | Lermuzeaux et al. ....... 395/186 |
| 5,675,711 | A | * | 10/1997 | Kephart et al. ................ 706/12 |
| 5,732,273 | A | | 3/1998 | Srivastava et al. ........... 395/704 |
| 5,790,858 | A | | 8/1998 | Vogel .......................... 395/704 |
| 5,907,834 | A | * | 5/1999 | Kephart et al. ................ 706/20 |
| 5,987,250 | A | | 11/1999 | Subrahmanyam ........... 395/704 |
| 5,991,881 | A | * | 11/1999 | Conklin et al. .............. 713/201 |
| 6,009,514 | A | | 12/1999 | Henzinger et al. ........... 712/236 |
| 6,026,236 | A | | 2/2000 | Fortin et al. ................. 395/704 |
| 6,094,530 | A | | 7/2000 | Brandewie ................... 395/704 |
| 6,119,236 | A | * | 9/2000 | Shipley ........................ 713/201 |
| 6,266,408 | B1 | | 5/2001 | Sirosh .......................... 382/224 |
| 6,282,701 | B1 | | 8/2001 | Wygodny et al. .............. 717/4 |
| 6,321,338 | B1 | * | 11/2001 | Porras et al. ................ 713/201 |
| 6,347,374 | B1 | * | 2/2002 | Drake et al. ................. 713/200 |
| 6,370,648 | B1 | * | 4/2002 | Diep ............................ 713/201 |
| 6,405,318 | B1 | * | 6/2002 | Rowland ...................... 713/200 |
| 6,681,331 | B1 | * | 1/2004 | Munson et al. .............. 713/201 |
| 2002/0138753 | A1 | * | 9/2002 | Munson ....................... 713/200 |
| 2003/0200462 | A1 | * | 10/2003 | Munson ....................... 713/200 |
| 2005/0044406 | A1 | * | 2/2005 | Stute ............................ 713/201 |

OTHER PUBLICATIONS

Cannady, "Artificial Neural Networks for Misuse Detection" Oct. 1998, School of Computer and Information Sciences Nova Southeastern University, p. 1–14.*

Cannady et al, "The Application of Artificial Neural Networks to Misuse Detection: Initial Results", Mar. 10, 1997, Georgia Tech Research Institute Georgia Institute of Technology, p. 1–13.*

Herringshaw, "Detecting Attacks on Networks" Dec. 1997, Industry Trends, p. 16–17.*

Mukherjee et al, "Network Intrusion Detection" May/Jun. 1994, IEEE Network, p. 26–41.*

Lane et al, "Sequence Matching and Learning in Anomaly Detection for Computer Security" 1997, School of Electrical and Computer Engineering Purdue University, p. 1–7.*

Dasgupta, D. et al., "Novelty Detection in Time Series Data Using Ideas from Immunology," 1995, 6 pages.

D'haeseleer, P. et al., "A Distributed Approach to Anomaly Detection," Aug. 30, 1997, 30 pages.

D'haeseleer, P. et al., "An Immunology Approach to Change Detection: Algorithms, Analysis and Implications," *IEEE Symposium on Security and Privacy,* 1996, 10 pages.

Forrest, S. et al., "Computer Immunology," *Comm. of the ACM,* Mar. 21, 1996, 18 pages.

Forrest, S. et al., "Self–Nonself Discrimination in a Computer," *Proceedings of IEEE Symposium on Research in Security and Privacy,* 1994, 11 pages.

Hofmeyr, S.A., "Intrusion Detection Using Sequences of System Calls," Dec. 17, 1997, 41 pages.

Hofmeyr, S.A. et al., "Architecture for an Artificial Immune System," 2000, 31 pages.

Somayaji, A. et al., "Automated Response Using System–Call Delays," *Proceedings of the 9th USENIX Security Simposium,* Aug. 14–17, 2000, 13 pages.

Somayaji, A. et al., "Principles of a Computer Immune System," *ACM, New Security Paradigms Workshop,* Langdale, Cumbria UK, 1998, 75–82.

Warrender, C. et al., "Detecting Intrusions Using System Calls: Alterative Data Models," *IEEE Computer Society, Symposium on Security and Privacy.* 1999, 133–145.

Anderson, D. et al., "Next–generation intrusion detection expert system (NIDES)," Technical Report, Computer Science Laboratory, SRI International, Menlo Park, CA, SRI–CSL–95–07, May, 1995, 1–37 (plus 6 additional pages).

Anderson, D. et al., "Detecting Unusual Program Behavior Using the Statistical Component of the Next–generation Intrusion Detection Expert System (NIDES)," SRI–CSL–95–06, SRI International, Menlo Park, CA, May, 1995, 1–71, 73–75, 77 (plus 6 additional pages).

Aslam, T. et al., "Use of A Taxonomy of Security Faults," Technical Report TR–96–051, COAST Lab, Purdue University, presented at 19th National Information Systems Security Conference, Sep., 1996, 1–10.

Ball, T. et al., "Optimally Profiling and Tracing Programs," Technical Report #1031, University of Wisconsin, Computer Science Dep., Sep., 1991, 1–27.

Bishop, M., "A Standard Audit Log Format," *Proc. of the 18th National Information Systems Security Conference,* 1995, 136–145.

Bishop, M., "Profiling Under UNIX by Patching," *Software–Practice and Exp.,* Oct. 1987, 17(10), 729–739.

Crosbie, M. et al., "Defending a Computer System using Autonomous Agents," Technical Report No. 95–022, COAST Laboratory, Dept. of Computer Sciences, Purdue University, Mar., 1994, 1–11.

Denning, D., "An Intrusion–Detection Model," *IEEE Transactions on Software Engineering,* Feb. 1987, 13(2), 222–232.

Elbaum, S. et al., "Intrusion Detection through Dynamic Software Measurement," *Proc. Usenix Workshop on Intrusion Detection and Networking Monitoring,* Santa Clara, California, Apr. 9–12, 1999, 1–10.

Graham, S.L. et al., "An Execution Profiler for Modular Programs," *Software Practice and Exp.,* 1983, 13, 671–685.

Hall, R.J., "Call Path Profiling," *Proc. 14th Int'l. Conf. Soft. Engineering,* ACM, 1992, 296–306.

Halme, L. et al., "AINT misbehaving—a Taxonomy of Anti–intrusion Techniques," *Proc. of the 18th National Information Systems Security Conference,* 1995, 13 pages.

Hochberg, J. et al., "NADIR: An Automated System for Detecting Network Intrusion and Misuse," *Computers & Security,* 1993, 12(3), 235–248.

Ilgun, K., "USTAT: A Real–time Intrusion Detection System for UNIX," *Proc. of the IEEE Symposium on Research in Security and Privacy,* May 24–25, 1993, 16–28.

Javitz, H. et al., "The SRIIDES Statistical Anomaly Detector," *Proc. of the IEEE Symposium on Research in Security and Privacy,* May 20–22, 1991, 316–326.

Johnson, "Profiling for Fun and Profit," *UNSENIX Winter '90 Conference Proceedings,* 1990, 325–330.

Jonsson, E. et al. "A Quantitative Model of the Security Intrusion Process Based on Attacker Behavior," *IEEE Transactions on Software Engineering,* Apr., 1997, 23(4), 235–245.

Kumar, S. et al., "A Pattern Matching Model for Misuse Intrusion Detection," *Proc. of the 17th National Computer Security Conference,* COAST Laboratory, Dept. of Computer Sciences, Purdue University, Oct. 1994, 11–21.

Kumar, S. et al., "A Software Architecture to Support Misuse Intrusion Detection," *Proc. 18th National Information Systems Security Conference,* COAST Laboratory, Dept. of Computer Sciences, Purdue University, Mar. 1995, 1–17.

Lankiewicz, L. et al., "Real–Time Anomaly Detection Using a Nonparametric Pattern Recognition Approach," Seventh Annual Computer Security Applications Conference, San Antonio, Texas, Dec. 2–6, 1991, 80–89.

Larus, J.R., et al., "Abstract Execution: A Technique for Efficiently Tracing Programs," *Software–Practice and Experience,* Dec., 1990, 20(12), 1241–1258.

Larus, J.R. et al., "Rewriting Executable Files to Measure Program Behavior," Technical Report #1083, University of Wisconsin, Computer Science Dep., Mar. 25, 1992, 1–17.

Lunt, T., "A Survey of Intrusion Detection Techniques," *Computers & Security,* 1993, 12, 405–418.

Mukherjee, B. et al., "Network Intrusion Detection," *IEEE Network,* May/Jun., 1994, 8(3), 26–41.

Munson, J., "A Functional Approach to Software Reliability Modeling," In *Quality of Numerical Software, Assessment and Enhancement,* Boisvert (ed.), Chapman & Hall, London, 1997, 61–76.

Petersen, K., "IDA—Intrusion Detection Alert," *Proc. of the IEEE Annual International Computer Software and Applications Conference,* Chicago, IL, Sep. 21–25, 1992, 306–311.

Porras, P. et al., "Penetration State Transition Analysis—A Rule–Based Intrusion Detection Approach," *Eighth Annual Computer Security Applications Conference,* IEEE Computer Society Press, Nov. 30–Dec. 4, 1992, 220–229.

Power, L.R., "Design and use of a program execution analyzer," *IBM Systems J.,* 1983, 22(3), 271–294.

Puketza, N. et al., "A Methodology for Testing Intrusion Detection Systems," *IEEE Transactions on Software Engineering,* Oct., 1996, 22(10), 719–729.

Shieh et al., "A Pattern–Oriented Intrusion–Detection Model and Its Applications," *Proc. of the 1991 IEEE Symposium on Research in Security and Privacy,* Oakland, Calif., May 20–22, 1991, 327–342.

Smaha, S., "Haystack: An Intrusion Detection System," *Proceedings of the Fourth Aerospace Computer Security Applications Conference,* Orlando, Florida, IEEE Computer Society, Dec. 12–16, 1988, 37–44.

Smith, M.D., "Tracing with Pixie," Stanford University Technical Report No. CSL–TR–91–497, Apr. 4, 1991, 1–29.

Sobirey, M. et al., "The Intrusion Detection System AID. Architecture, and Experiences in Automated Audit Analysis," *Proc. of the International Conference on Communications and Multimedia Security,* Sep. 23–24, 1996, 278–290.

Speer, S.E., "Improving UNIX Kernel Performance Using Profile Based Optimization," Winder USENIX, Jan. 17–21, 1994, 181–188.

Teng, H. et al., "Adaptive Real–Time Anomaly Detection Using Inductively Generated Sequential Patterns," *Proc. of the IEEE Symposium on Research in Security and Privacy,* Oakland, CA, May 7–9, 1990, 278–284.

Vaccaro, H. et al., "Detection of Anomalous Computer Session Activity," *Proc. of the IEEE Symposium on Research in Security and Privacy,* Oakland, CA, May 1–3, 1989, 280–289.

Wall, D.W., "Global Register Allocation at Link Time," Digital Equipment Corporation, WRL Research Report 86/3, Oct., 1986 1–20.

\* cited by examiner

METHOD OF AND SYSTEM FOR DETECTING AN ANOMALOUS OPERATION OF A COMPUTER SYSTEM

RELATED APPLICATION

This application is a continuation of prior co-pending application Ser. No. 09/309,755, filed May 11, 1999, now U.S. Pat. No. 6,681,331.

FIELD OF THE INVENTION

The present invention generally relates to detecting the use of software, and more specifically, to the dynamic detection of an intrusive anomalous use of computer software.

BACKGROUND OF THE INVENTION

The literature and media abound with reports of successful violations of computer system security by both external attackers and internal users. These breaches occur through physical attacks, social engineering attacks, and attacks on the system software. In a system software attack, the intruder subverts or bypasses the security mechanisms of the system in order to gain unauthorized access to the system or to increase current access privileges. These attacks are successful when the attacker is able to cause the system software to execute in a manner that is typically inconsistent with the software specification and thus leads to a breach in security.

Intrusion detection systems monitor some traces of user activity to determine if an intrusion has occurred. The traces of activity can be collated from audit trails or logs, network monitoring or a combination of both. Once the data regarding a relevant aspect of the behavior of the system are collected, the classification stage starts. Intrusion detection classification techniques can be broadly catalogued in the two main groups: misuse intrusion detection, and anomaly intrusion detection. The first type of classification technique searches for occurrences of known attacks with a particular "signature," and the second type searches for a departure from normality. Some of the newest intrusion detection tools incorporate both approaches.

One prior art system for detecting an intrusion is the EMERALD™ program. EMERALD defines the architecture of independent monitors that are distributed about a network to detect intrusions. Each monitor performs a signature or profile analysis of a "target event stream" to detect intrusions and communicates such detection to other monitors on the system. The analysis is performed on event logs, but the structure of the logs is not prescribed and the timeliness of the analysis and detection of an intrusion depends on the analyzed system and how it chooses to provide such log data. By monitoring these logs, EMERALD can thus determine that at some point in the event stream that was recorded in the log, an intrusion occurred. However, the detection is generally not implemented in real time, but instead occurs at some interval of time after the intrusion. Also, this prior art system does not allow monitoring of all types of software activity, since it is limited to operating system kernel events.

Accordingly, it would be desirable to provide a real time intrusion detection paradigm that is applicable to monitoring almost any type of program. It would be preferable to detect an intrusion based on the measurement of program activity as control is passed among program modules. As a system executes its customary activities, the intrusion detection scheme should estimate a nominal system behavior. Departures from the nominal system profile will likely represent potential invidious activity on the system. Since unwanted activity may be detected by comparison of the current system activity to that occurring during previous assaults on the system, it would be desirable to store profiles for recognizing these activities from historical data. Historical data, however, cannot be used to recognize new kinds of assaults. An effective security tool would be one designed to recognize assaults as they occur through the understanding and comparison of the current behavior against nominal system activity. Currently, none of the prior art techniques fully achieve these objectives.

SUMMARY OF THE INVENTION

The present invention represents a new software engineering approach to intrusion detection using dynamic software measurement to assist in the detection of intruders. Dynamic software measurement provides a framework to analyze the internal behavior of a system as it executes and makes transitions among its various modules governed by the structure of a program call graph. A target system is instrumented so that measurements can be obtained to profile the module activity on the system in real time. Essentially, this approach measures from the inside of a software system to make inferences as to what is occurring outside of the program environment. In contrast, the more traditional approach of the prior art measures or profiles system activity from system log files and other such patterns of externally observable behavior.

Program modules are distinctly associated with certain functionalities that a program is capable of performing. As each functionality is executed, it creates its own distinct signature of transition events. Since the nominal behavior of a system is more completely understood while it is executing its customary activities, this nominal system behavior can be profiled quite accurately. Departures from a nominal system profile represent potential invidious activity on the system. New profiles of intrusive behavior can be stored and used to construct an historical database of intrusion profiles. However, these historical data cannot be used as a basis for the recognition of new types of assaults. The present invention is designed to recognize assaults as they occur through the understanding and comparison of the current behavior against nominal system activity.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Environment of the Present Invention

Figure 1:
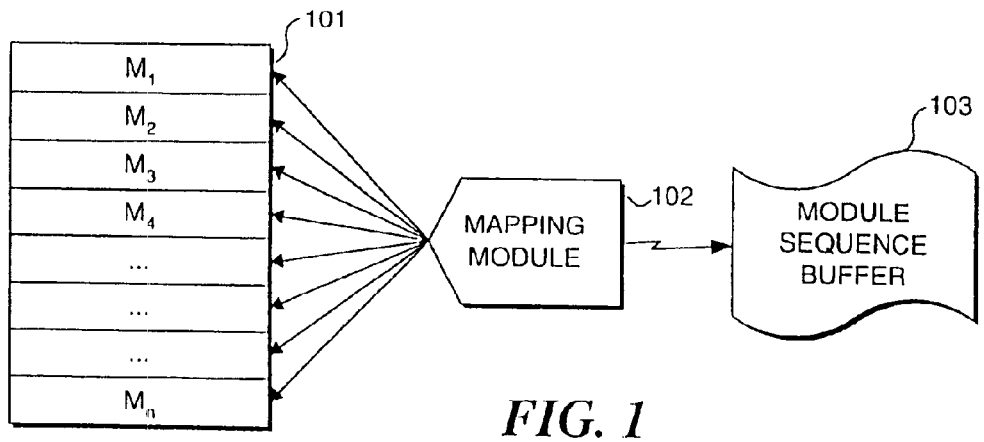
FIG. 1 is a block diagram illustrating the relationship between instrumented program modules and a mapping module that generates a sequence of module streams.

A system operating in accord with the present invention has three modes of operation. Each of these modes represents an incremental improvement in the ability of the system to detect an intrusion or abnormal use of the system or program executing thereon. However, as the resolving ability of the system increases, there is an associated penalty in processing overhead. In a first mode, simple execution profiles indicative of modules that have executed are employed for the evaluation of intrusive activity. This mode is the most coarse grained level of operation for the detection of intrusions, but it has the least cost in terms of performance of the three modes. In the second mode, transitions from one program module to the next are recorded, providing a much finer grained description of program behavior. This second mode is capable of detecting more subtle forms of attack and is also more costly to run in terms of the degradation of performance and consumption of computer memory. In a third mode, sequences of module transitions are mapped onto specific design specification elements, or functionalities. This third mode of operation can detect the most subtle of all intrusions, again at a greater expense of computation time and memory space. FIG. 1 illustrates the internal program environment of a program that has been suitably instrumented for anomaly and/or intrusion detection. Each program module, $M_i$, of a plurality of program modules 101 will have calls placed in it at each entry point and before each return. Control is passed to a mapping module 102 that records any transition into and out of a program module. The mapping module transmits the module transitions to a module sequence buffer 103 that buffers these data until they are requested from the external program environment. All of structures 101–103 are encapsulated within the operating environment of a program to which the present invention is applied to detect anomalous behavior or an intrusion.

Figure 2:
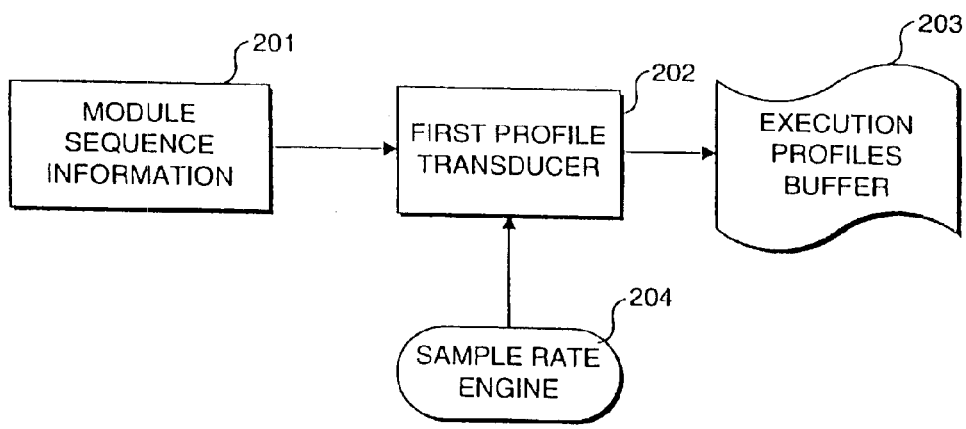
FIG. 2 is a block diagram illustrating the operation of a module sequence transducer of a first kind.

FIG. 2 shows the operation of a first profile transducer 202. It is the purpose of first profile transducer 202 to capture module sequence information 201 from the internally instrumented program environment. At intervals determined by an externally provided sampling engine 204, first profile transducer 201 interrogates module sequence buffer 103, requesting current profile information. The profile information obtained from the module sequence buffer is a list of all modules that have executed since the last interrogation, and the frequencies of their executions. First profile transducer 202 normalizes each of the module frequencies by dividing them by the total number of module transitions that have occurred during the sampling interval. These execution profiles are transmitted to and retained by an execution profile buffer 203.

Figure 3:
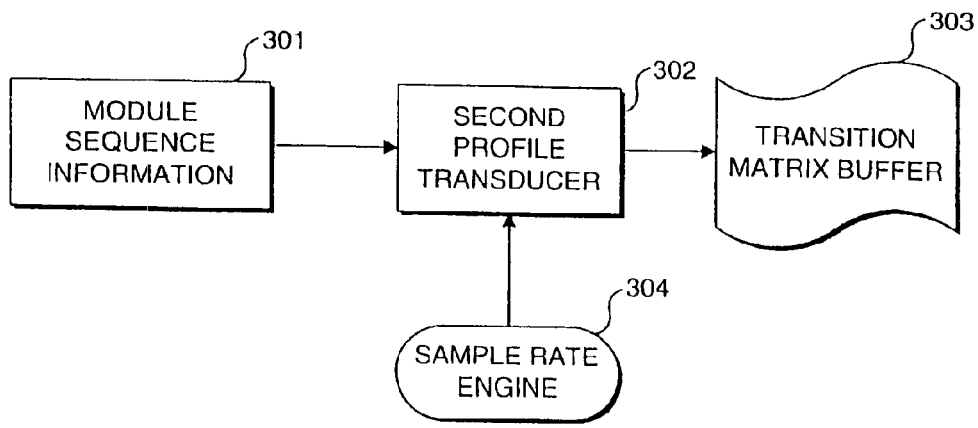
FIG. 3 is a block diagram illustrating the operation of a module sequence transducer of a second kind.

FIG. 3 shows the operation of a second profile transducer 302. Second profile transducer 302 captures module sequence information 301 from the internal instrumented program environment. At intervals determined by an externally provided sampling engine 304, which is substantially different than the interval determined by sampling engine 204, the second profile transducer interrogates module sequence buffer 103 for current profile information. The profile information requested from the module sequence buffer is the list of all modules that have executed since the last interrogation and the frequencies of their executions. Second profile transducer 302 develops a transition matrix for the current sampling interval. This transition matrix is an n×n matrix, where the entry in the $i^{th}$ row and the $j^{th}$ column is the frequency with which module i has transferred control to module j during the current sampling interval. The transition matrix is transmitted to and retained by a transition matrix buffer 303.

Figure 4:
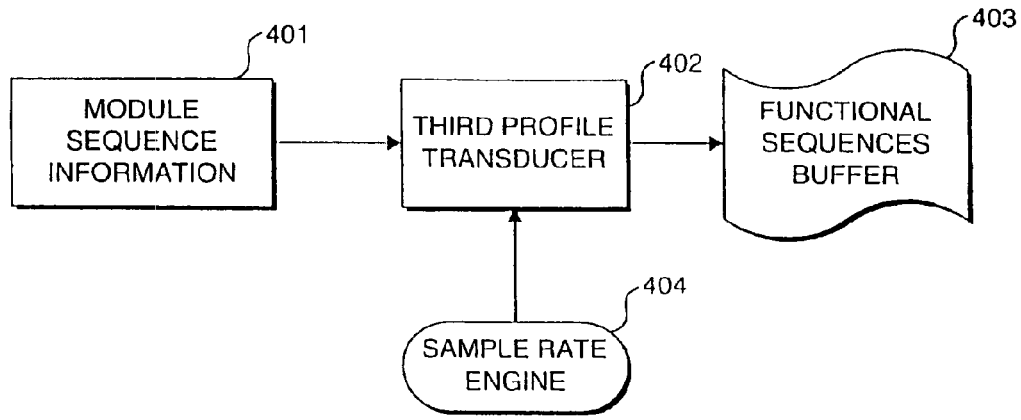
FIG. 4 is a block diagram illustrating the operation of a module sequence transducer of a third kind.

FIG. 4 shows the operation of the third profile transducer. It is the purpose of a third profile transducer 402 to capture module sequence information 401 from the internal instrumented program environment. At intervals determined by an externally provided sampling engine 404, the third profile transducer interrogates module sequence buffer 103 for current profile information. The profile information requested from the module sequence buffer is the list of all modules that have executed since the last interrogation and the frequency with which each module has executed during that interval. Third profile transducer 402 maps the sequence of module transitions representing subtrees on a program call graph into function sequences through the mapping of program functionalities to modules. These functional sequences are transmitted to and retained by a functional sequences buffer 403.

Figure 5:
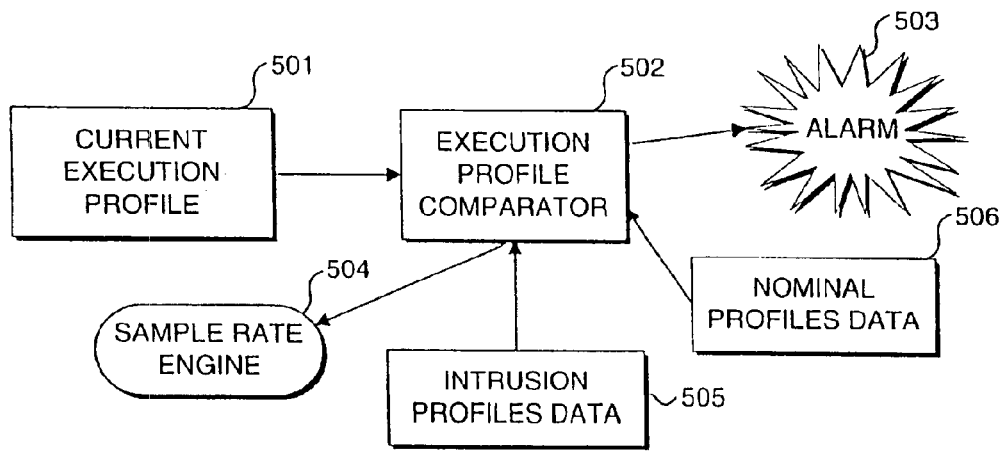
FIG. 5 is a block diagram illustrating the operation of a comparator of a first kind.

FIG. 5 shows the operation of an execution profile comparator 502. The execution profile comparator determines any difference (i.e., a differenced profile) between a current execution profile 501 most recently obtained from first profile transducer 202 and a nominal execution profile obtained from nominal profiles data 506, which represents the steady-state behavior of the software system with no intrusive activity. The nominal profiles data are initially established by a calibration process that is implemented by running the program in a calibration mode in which the program is run through as many of the functions and operations performed during a nominal operational phase. A nominal activity profile and boundary conditions for variations during this nominal operational phase are accumulated during this calibration mode. The nominal profile is subsequently modified by a user (or administrator), if during normal operation of the program an alarm is raised, but it is determined that no intrusion has occurred. In a typical software application, there may be a wide range of behavior that is considered nominal. The computational result of the comparison between the current execution profile and the steady state behavior of the system represented by the nominal profile suite is used in two different subsystems. First, if the total variance in the steady state profile rises above a pre-established threshold, then the recognition of an intrusive event becomes difficult. In this case, the comparator will increase the sampling rate set by the sample rate engine. Similarly, the sampling rate may be decreased when the system is operating in a more quiescent mode to lessen the impact of the detection process on the total system operation. Second, the differenced profile is analyzed to determine if it has crossed a predetermined threshold level that represents an unacceptable departure from the nominal system behavior. If so, then there is a potential new behavior on the system and a level 1 alarm 503 is raised. The system then attempts to match the differenced profile with known intrusion profiles data 505. If a match for the differenced profile is found in the intrusion profile data, then a level 2 alarm 503 is raised, indicating a certainty of an intrusive attack.

Figure 6:
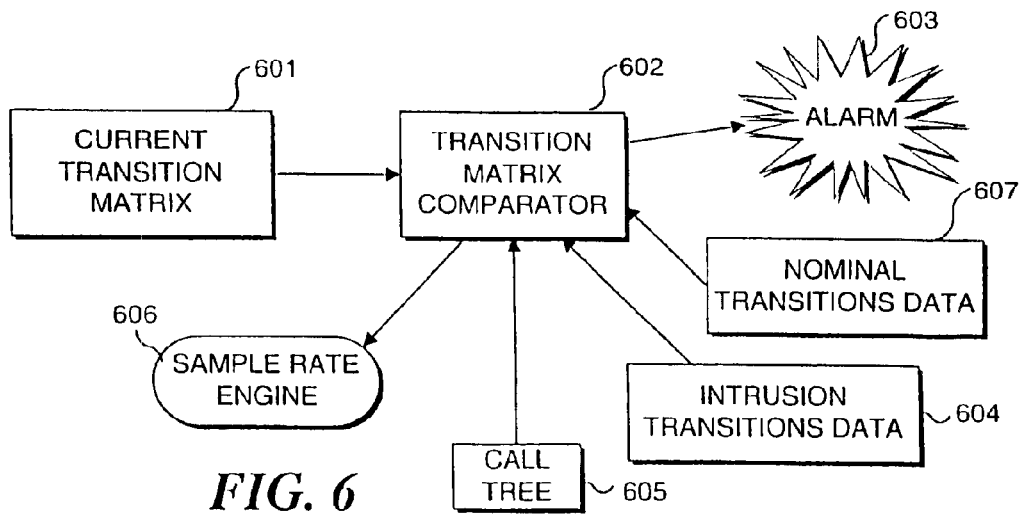
FIG. 6 is a block diagram illustrating the operation of a comparator of a second kind.

FIG. 6 illustrates operation of a transition matrix comparator 602. The transition matrix comparator determines any difference (i.e., a "differenced matrix") between a current transition matrix 601 that was most recently obtained from second profile transducer 302 and a nominal transition matrix obtained from nominal transitions data 607 representing the steady-state behavior of the software system with no intrusive activity. The result of the comparison between the current transition matrix and the steady state behavior of the system represented by the nominal transitions suite is used in two different subsystems. First, if the total variance in the steady state profile rises above a predefined threshold, the comparator will increase the sample rate determined by a sample rate engine 606. Similarly, the sampling rate may be decreased when the system is operating in a more quiescent mode to lessen the impact of the detection process on the total system operation. Second, the differenced matrix is analyzed to see whether it has crossed a predetermined threshold level that represents an unacceptable departure from the nominal system behavior. If so, then there is a potential new behavior on the system and a level 1 alarm 603 will be raised. Against this potential intrusive behavior, a static call tree 605 structure is stored in a single transition matrix. Embedded in this static call tree structure is a set of legitimate module transitions. A potentially new intrusive behavior may be characterized by abnormal transitions in current transition matrix 601. The system attempts to match the differenced matrix with known intrusion characteristics stored as sequences of characteristic transition matrix data 604. If a match for the differenced matrix is found in the intrusion transitions data, then a level 2 alarm 603 is raised, indicating a certainty of an intrusive attack.

Figure 7:
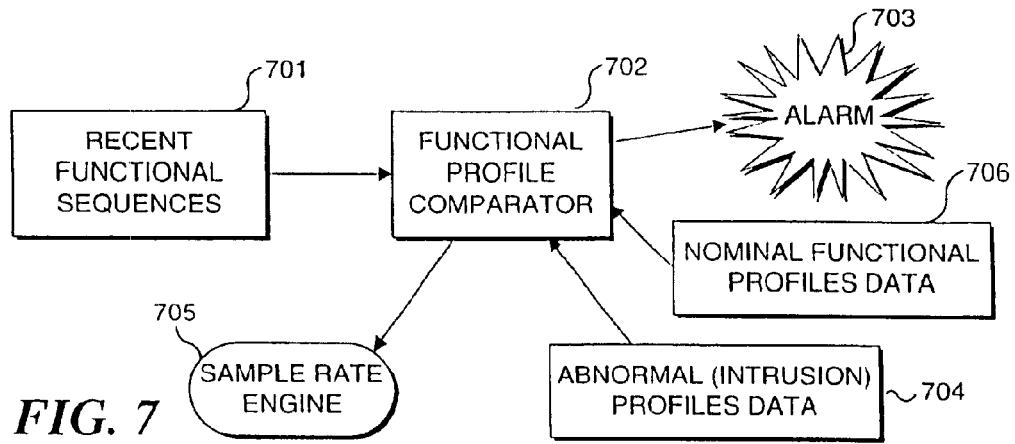
FIG. 7 is a block diagram illustrating the operation of a comparator of a third kind.

FIG. 7 shows the operation of a functional profile comparator 702, which behaves similar to execution profile comparator 502. The fundamental difference between these two comparators is that functional profile comparator 702 operates on functional profiles as opposed to execution profiles. Functional profile comparator 702 determines any difference ("a differenced profile") between a most recent functional sequence 701 obtained from third profile transducer 402 and a nominal functional profile obtained from nominal functional profiles data 706, which represents the steady-state behavior of the software system with no intrusive activity. The result of the comparison between the most recent functional sequences and the steady state behavior of the system represented by the nominal functional profile suite is again used in two different subsystems. First, if the total variance in the steady state profile rises above a predefined threshold, the comparator will increase the sample rate determined by a sample rate engine 705. Similarly, the sampling rate may be decreased when the system is operating in a more quiescent mode to lessen the impact of the detection process on the total system operation. Second, the differenced profile will be analyzed to see whether it has crossed a predetermined threshold level that represents an unacceptable departure from the nominal system behavior. In this event, there is a potential new behavior on the system, and a level 1 alarm 703 will be raised. The system then attempts to match this differenced profile with a known intrusion profile from known intrusion profiles data 704. If a match for the differenced profile is found in the intrusion profiles data then a level 2 alarm 703 will be raised, indicating a certainty of an intrusive attack.

Figure 8:
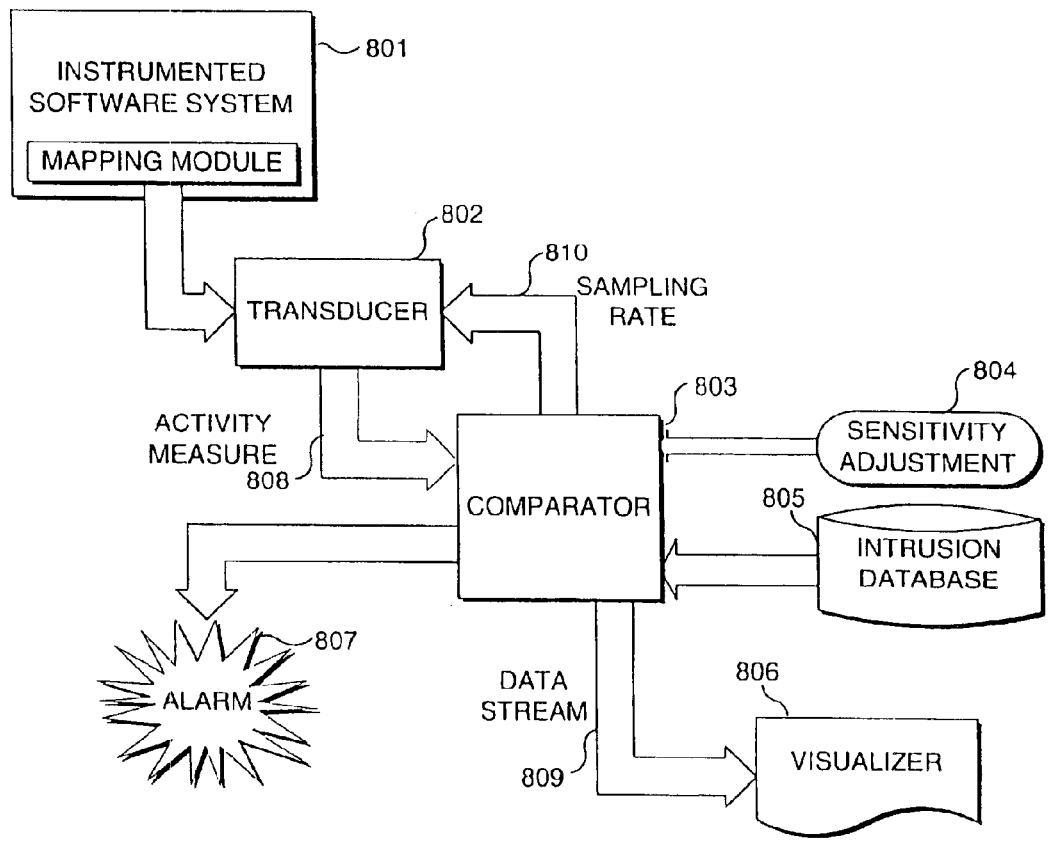
FIG. 8 is a block diagram illustrating an environment in which a preferred embodiment of the present invention operates.

FIG. 8 shows the relationship among the various components of the intrusion detection system. A transducer 802 and a comparator 803 are the essential functional components of the intrusion detection methodology. The transducer obtains signals from an instrumented software system 801 and computes activity measures for these signals. The actual software signals may be obtained either from instrumented code (software probes) or directly from a hardware address bus (a hardware probe). The inputs to the transducer are software module entry and exit events that may be obtained either from software or hardware instrumentation.

Depending on the level of resolution desired, the transducer will produce from the module transition events a summary profile of the execution transitions (execution profile), a transition matrix representing the frequency of transition events from one module to another, or a function sequence of program activity. The transducer interacts with the software system in real-time. That is, all transition events are available to the transducer as they occur.

The output of transducer 802 is sent directly to comparator 803 for analysis. The rate at which these data are obtained is controlled by the comparator. During periods of relatively light computational activity when there is little likelihood of an intrusion, the sampling interval might be set to be relatively long. Alternatively, during periods of extensive system activity, the sampling frequency can be increased to provide increased resolution on system activity. All sampling activity is measured in system epochs, or module transitions. The sampling rate 810 is controlled by the sample rate engine (not separately shown) associated with the comparator.

Each activity measure 808 is obtained from transducer 802 by comparator 803. The comparator makes a formal assessment as to whether the current system activity is non-threatening (nominal) or otherwise. There are essentially two types of non-nominal activity. The first occurs as new users or new programs are being run on the system. This new activity is reviewed by an external decision maker, such as the system administrator, and if determined to be non-threatening by that person, is added to the system repertoire of nominal behavior in an intrusion database 805. However, the observed activity may represent an intrusion event. There are two types of intrusion events. First, there are existing or known intrusion events. These have well-known and established intrusion profiles that are stored in intrusion database 805. Comparator 803 will search intrusion database 805 for a matching profile, and if it finds a matching profile, will raise a level 2 alarm 807. A level 2 alarm means that there is a high level of certainty that an intrusion event is in progress. If, on the other hand, the intrusion event is not found in intrusion database 805, comparator 803 will raise a level 1 alarm 807, indicating that new behavior has been observed on the system. Typically, the level 1 alarm system would be referred to a system administrator and/or an artificial intelligence (AI) engine for review.

The ability to recognize an actual intrusion event is dependent on the variance in the profiles of software activity. This variation may be controlled by varying the sampling rate of the instrumented software. The sampling rate is controlled by a sensitivity adjustment 804, which can be designed into the software and/or controlled by input from the system administrator.

To enhance the overall viability of the system to detect new and unobserved intrusion events, a visualizer 806 may optionally be added to the system. This visualizer receives a data stream 809 from the comparator and graphically displays module transition information in a continuous recording strip on a display terminal (not separately shown). The moving image of system activity closely resembles a sidescan sonar display. Module (or functionality) frequency data are displayed to render a visual image of overall system activity. Human pattern recognition ability currently greatly surpasses that of any available software. The visualizer provides a real-time image of system activity from which abnormal activity may be detected by a system administrator using this superior pattern recognition capability.

A Profile-Oriented Anomaly Detection Model

As any software system is being specified, designed and developed, it is constructed to perform a distinct set of mutually exclusive operations O for the customer. An example of such an operation might be the activity of adding a new user to a computer system. At the software level, these operations must be reduced to a well defined set of functions F. These functions represent the decomposition of operations into sub-problems that may be implemented on computer systems. The operation of adding a new user to the system might involve the functional activities of changing from the current directory to a password file, updating the password file, establishing user authorizations, and creating a new file for the new user. During the software design process, the basic functions are mapped by system designers to specific software program modules that implement the functionality.

From the standpoint of computer security, not all operations are equal. Some user operations may have little or no impact on computer security considerations. Other operations, such as system maintenance activities, have a much greater impact on security. System maintenance activities being performed by system administrators would be considered nominal system behavior. System maintenance activities being performed by dial-up users, on the other hand, would not be considered nominal system behavior. In order to implement this decomposition process, a formal description of these relationships must be established. To assist in the subsequent discussion of program functionality, it will be useful to make this description somewhat more precise by introducing some notation conveniences.

Formal Description of Software Operation

Assume that a software system S was designed to implement a specific set of mutually exclusive functionalities F. Thus, if the system is executing a function $f \in F$, then it cannot be expressing elements of any other functionality in F. Each of these functions in F was designed to implement a set of software specifications based on a user's requirements. From a user's perspective, this software system will implement a specific set of operations O. This mapping from the set of user perceived operations O to a set of specific program functionalities is one of the major functions in the software specification process. It is possible, then, to define a relation IMPLEMENTS over O×F such that IMPLEMENTS(o, $f$) is true if functionality $f$ is used in the specification of an operation o.

From a computer security standpoint, operations can be envisioned as the set of services available to a user (e.g., login, open a file, write to a device), and functionalities as the set of internal operations that implement a particular operation (e.g., user-id validation, access control list (ACL) lookup, labeling). When viewed from this perspective, it is apparent that user operations, which may appear to be non-security relevant, may actually be implemented with security relevant functionalities (send mail is a classic example of this, an inoffensive operation of send mail can be transformed into an attack, if the functionalities that deal with buffers are thereby overloaded).

The software design process is strictly a matter of assigning functionalities in F to specific program modules $m \in M$, the set of program modules of system S. The design process may be thought of as the process of defining a set of relations ASSIGNS over F×M, such that ASSIGNS($f$, m) is true if functionality $f$ is expressed in module m. For a given software system S, let M denote the set of all program modules for that system. For each function $f \in F$, there is a relation p over F×M such that p($f$, m) is the proportion of execution events of module m when the system is executing function $f$.

Each operation that a system may perform for a user may be thought of as having been implemented in a set of functional specifications. There may be a one-to-one mapping between the user's notion of an operation and a program function. In most cases, however, there may be several discrete functions that must be executed to express the user's concept of an operation. For each operation o that the system may perform, the range of functionalities $f$ must be well known. Within each operation, one or more of the system's functionalities will be expressed.

The Software Epoch

When a program is executing a functionality, it apportions its activities among a set of modules. As such, it transitions from one module to the next on a call (or return) sequence. Each module called in this call sequence will have an associated call frequency. When the software is subjected to a series of unique and distinct functional expressions, there is a different behavior for each of the user's operations, in that each will implement a different set of functions, which, in turn, invoke possibly different sets of program modules.

An epoch begins with the onset of execution in a particular module and ends when control is passed to another module. The measurable event for modeling purposes is this transition among the program modules. Calls from a module are accumulated, along with returns to that module, to produce a total count. Each of these transitions to a different program module from the one currently executing represents an incremental change in the epoch number. Computer programs executing in their normal mode make state transitions between program modules rather rapidly. In terms of real clock time, many epochs may elapse in a relatively short period.

Formal Definitions of Profiles

It can be seen that there is a distinct relationship between any given operation o and a given set of program modules. That is, if the user performs a particular operation, then this operation manifests itself in certain modules receiving control. It is also possible to detect, inversely, which program operations are being executed by observing the pattern of modules executing, i.e., the module profile. In a sense then, the mapping of operations to modules and the mapping of modules to operations is reflexive.

It is a most unfortunate accident of most software design efforts that there are really two distinct set of operations. On the one hand, there is a set of explicit operations $O_E$. These are the intended operations that appear in the Software Requirements Specification documents. On the other hand, there is also a set of implicit operations $O_I$ that represents unadvertised features of the software, which have been implemented through designer carelessness or ignorance. These implicit operations are neither documented nor well known except by a group of knowledgeable and/or patient system specialists, called hackers.

Since the set of implicit operations $O_I$ is not well known for most systems, most system administrators are obliged to learn about implicit operations by carefully investigating program behavior, or by experiencing the unfortunate results of an intrusion by someone who has learned about these operations. Hackers and other interested citizens will find implicit operations and exploit them. What is known is the set of operations $O_E$ and the mappings of the operations onto the set of modules M. For each of the explicit operations there is an associated module profile. That is, if an explicit operation is executed, then a well-defined set of modules will execute in a very predictable fashion. This fact may be exploited to develop a reasonable profile of the system when it is executing operations from the set of explicit operations. This nominal system behavior serves as a stable reference against which intrusive activity may be measured. That is, when an observation is made of module profiles that is not representative of the operations in $O_E$, an assumption may be made that the new observation is one or more operations from the set $O_I$; in other words, there is an intruder present.

When the process of software requirements specification is complete, a system consisting of a set of a mutually exclusive operations will have been defined. Characteristically, each user of a new system will cause each operation to be performed at a potentially different rate than another user. Each user, then, will induce a probability distribution on the set O of mutually exclusive operations. This probability function is a multinomial distribution and constitutes the operational profile for that user.

The operational profile of a software system is the set of unconditional probabilities of each of the operations in O being executed by the user. Then, $Pr[X=k]$, $k=1, 2, \ldots, |O|$ is the probability that the user is executing program operation k as specified in the functional requirements of the program and $\|O\|$ is the cardinality of the set of operations. A program executing on a serial machine can only be executing one operation at a time. The distribution of the operational profile is thus multinomial for programs designed to fulfill more than two distinct operations.

A user performing the various operations on a system causes each operation to occur in a series of steps or transitions. The transition from one operation to another may be described as a stochastic process. In this case, an indexed collection of random variables $\{X_t\}$ may be defined, where the index t runs through a set of non-negative integers t=0, 1, 2, ... representing the individual transitions or intervals of the process. At any particular interval, the user is found to be expressing exactly one of the system's a operations. The fact of the execution occurring in a particular operation is a state of the user. During any interval, the user is found performing exactly one of a finite number of mutually exclusive and exhaustive states that may be labeled 0, 1, 2, . . . a. In this representation of the system, there is a stochastic process $\{X_t\}$, where the random variables are observed at intervals t=1, 2, . . . and where each random variable may take on any one of the (a+1) integers, from the state space $O=\{0, 1, 2, \ldots, a\}$.

Each user may potentially bring his/her own distinct behavior to the system. Thus, each user will have a unique characteristic operational profile. It is a characteristic, then, of each user to induce a probability function $p_i=Pr[X=i]$ on the set of operations O. In that these operations are mutually exclusive, the induced probability function is a multinomial distribution.

As the system progresses through the steps in the software lifecycle, the user requirements specifications, the set O must be mapped on a specific set of functionalities F by systems designers. This set F is in fact the design specifications for the system. As per the earlier discussion, each operation is implemented by one for more functionalities. The transition from one functionality to another may be also described as a stochastic process. Thus, a new indexed collection of random variables $\{Y_t\}$ may be defined, representing the individual transitions events among particular functionalities. At any particular interval, a given operation expresses exactly one of the system's b+1 functionalities. During any interval, the user is found performing exactly one of a finite number of mutually exclusive and exhaustive states that may be labeled 0, 1, 2, . . . , b. In this representation of the system, there is a stochastic process $\{Y_t\}$, where the random variables are observed at intervals t=0, 1, 2, . . . and where each random variable may take on any one of the (b+1) integers, from the state space $F=\{0, 1, 2, \ldots, b\}$.

When a program is executing a given operation, say $o_k$, it will distribute its activity across the set of functionalities $F^{(o_k)}$. At any arbitrary interval, n, during the expression of $o_k$, the program will be executing a functionality $f_i \in F^{(o_k)}$ with a probability, $Pr[Y_n=i|X=k]$. From this conditional probability distribution for all operations, the functional profile for the design specifications may be derived as a function of a user operational profile, as:

$$Pr[Y=i]=\Sigma_j Pr[X=j]Pr[Y=i|X=j].$$

Alternatively:

$$w_i=\Sigma_j p_j Pr[Y=i|X=j].$$

The next logical step is to study the behavior of a software system at the module level. Each of the functionalities is implemented in one or more program modules. The transition from one module to another may be also described as a stochastic process. Therefore, a third indexed collection of random variables $\{Z_t\}$ may be defined, as before, representing the individual transitions events among the set of program modules. At any particular interval, a given functionality is found to be executing exactly one of the system's c modules. The fact of the execution occurring in a particular module is a state of the system. During any interval, the system is found executing exactly one of a finite number of mutually exclusive and exhaustive states (program modules) that may be labeled 0, 1, 2, . . . , c. In this representation of the system, there is a stochastic process $\{Z_t\}$, where the random variables are observed at epochs t=0, 1, 2, . . . and where each random variable may take on any one of the (c+1) integers, from the state space $M=\{0, 1, 2, \ldots, c\}$.

Each functionality j has a distinct set of modules $M_{f_j}$ that it may cause to execute. At any arbitrary interval n during the expression of $f_j$, the program will be executing a module $m_i \alpha M_{f_j}$ with a probability $Pr[Z_n=i|Y=j]$. From this condition probability distribution for all functionalities, the module profile for the system may be derived as a function of the system functional profile as follows:

$$Pr[Z=i]=\Sigma_j Pr[Y=j]Pr[Z=i|Y=j].$$

Again, $$r_i=\Sigma_j w_j Pr[Z=i|Y=j].$$

The module profile r ultimately depends on the operational profile p as can be seen by substituting for $w_j$ in the equation above.

$$r_i=\Sigma_j \Sigma_k p_k Pr[Y=j|X=k]Pr[Z=i|Y=j]$$

Each distinct operational scenario creates its own distinct module profile. It is this fact that is exploited in the detection of unwanted or intrusive events in the present invention.

Point Estimates for Profiles

The focus will now shift to the problem of developing point estimates for the probabilities for various profiles.

These profiles were recognized in terms of their multinomial nature. The multinomial distribution is useful for representing the outcome of an experiment involving a set of mutually exclusive events. Let $$S = \bigcup_{i=1}^{M} S_i$$

where $S_i$ is one of M mutually exclusive sets of events. Each of these events would correspond to a program executing a particular module in the total set of program modules. Further, let $Pr(S_i) = w_i$ and:

$$w_T = 1 - w_1 - w_2 - \ldots - w_M,$$

under the condition that T=M+1, as defined earlier. Accordingly, $w_i$ is the probability that the outcome of a random experiment is an element of the set $S_i$. If this experiment is conducted over a period of n trials, then the random variable $X_i$ will represent the frequency of $S_i$ outcomes. In this case, the value n represents the number of transitions from one program module to the next. Note that:

$$X_T = n - X_1 - X_2 - \ldots - X_M$$

This particular distribution will be useful in the modeling of a program with a set of k modules. During a set of n program steps, each of the modules may be executed. These, of course, are mutually exclusive events. If module i is executing, then module j cannot be executing.

The multinomial distribution function with parameters n and $w = (w_1, w_2, \ldots, w_T)$ is given by:

$$f(x \mid n, w) = \begin{cases} \dfrac{n!}{\prod_{i=1}^{k-1} x_i!} w_1^{x_1} w_2^{x_2} \cdots w_M^{w_M}, & (x_1, x_2, \cdots, x_M) \in S \\ 0 & \text{elsewhere} \end{cases}$$

where $x_i$ represents the frequency of execution of the $i^{th}$ program module.

The expected values for $x_i$ are given by:

$$E(x_i) = \overline{x_i} = nw_i, \quad i=1,2,\ldots, k,$$

the variances by:

$$\text{Var}(x_i) = nw_i(1 - w_i)$$

and the covariance by:

$$\text{Cov}(w_i, w_j) = -nw_i w_j, \quad i \neq j.$$

It now becomes necessary to understand the precise multinomial distribution of a program's execution profile while it is executing a particular functionality. The problem is that every time a program is run, there will be some variation in the profile from one execution sample to the next. It will be difficult to estimate the parameters $w = (w_1, w_2, \ldots, w_T)$ for the multinomial distribution of the execution profile. Rather than estimating these parameters statically, it is far more useful to get estimates of these parameters dynamically as the program is actually in operation, hence the utility of the Bayesian approach.

To aid in the process of characterizing the nature of the true underlying multinomial distribution, observe that the family of Dirichlet distributions is a conjugate family for observations that have a multinomial distribution. The probability density function for a Dirichlet distribution, $D(\alpha, \alpha_T)$, with a parametric vector $\alpha = (\alpha_1, \alpha_2, \ldots, \alpha_{k-1})$ where ($\alpha_i > 0$; i=1, 2, ..., k-1) is:

$$f(w \mid \alpha) = \frac{\Gamma(\alpha_1 + \alpha_2 + \cdots + \alpha_M)}{\prod_{i=1}^{M} \Gamma(\alpha_i)} w_1^{\alpha_1 - 1} w_2^{\alpha_2 - 1} \cdots w_M^{\alpha_M - 1}$$

where ($w_i > 0$; i=1,2,..., M) and $$\sum_{i=1}^{M} w_i = 1.$$

The expected values of the $w_i$ are given by $$E(w_i) = \mu_i = \frac{\alpha_i}{\alpha_0} \quad (1)$$

where $$\alpha_0 = \sum_{i=1}^{T} \alpha_i.$$

In this context, $\alpha_0$ represents the total epochs. The variance of the $w_i$ is given by:

$$\text{Var}(w_i) = \frac{\alpha_i(\alpha_0 - \alpha_i)}{\alpha_0^2(\alpha_0 + 1)} \quad (2)$$

and the covariance by:

$$\text{Cov}(w_i, w_j) = \frac{\alpha_i \alpha_j}{\alpha_0^2(\alpha_0 + 1)}.$$

The value of the use of the Dirichlet conjugate family for modeling purposes is twofold. First, it permits the probabilities of the module transitions to be estimated directly from the observed transitions. Secondly, it is possible to obtain revised estimates for these probabilities as the observation process progresses. Now consider the behavior of a software system whose execution profile has a multinomial distribution with parameters n and $W = (w_1, w_2, \ldots, w_{k-1})$ where n is the total number of observed module transitions and the values of the $w_1$ are unknown. It is assumed that the prior distribution of W is a Dirichlet distribution with a parametric vector $\alpha = (\alpha_1, \alpha_2, \ldots, \alpha_{k-1})$ where ($\alpha_i > 0$; i=1, 2, ..., k-1). Then the posterior distribution of W for the behavioral observation $X = (x_1, x_2, \ldots, x_{k-1})$ is a Dirichlet distribution with parametric vector $\alpha^* = (\alpha_1 + \alpha_1, \alpha_2 + x_2, \ldots \alpha_{k-1} + x_{k-1})$. As an example, consider the behavior of a large software system with such a parametric vector. As the system makes sequential transitions from one module to another, the posterior distribution of W at each transition will be a Dirichlet distribution. Further, for i=1, 2, ... T, the $i^{th}$ component of the augmented parametric vector $\alpha$ will be increased by 1 unit each time module $m_i$ is executed.

Recognizing Abnormalities

Program modules are bound together by a call graph whose structure is described by the CALL relation over M×M. From this call graph, a probability adjacency matrix P may be constructed whose entries represent the transition probabilities from each module to another module at each epoch in the execution process. Thus, the element $p_{ij}^{(n)}$ of this matrix on the $n^{th}$ epoch are the probabilities that CALL($m_i$, $m_j$) is true for that epoch.

As a program executes an operation, it makes many module transitions. However, this process is not random. The order in which modules may be executed is determined by the call graph of a program. As a program executes, it transitions from one module to another in a sequence of module calls and returns. A sequence is thus an ordered set of events from a continuous event stream. It is possible, for example, to obtain from a software system during execution a sequence of module execution events represented by $<m_{a_1}, m_{a_2}, m_{a_3}, m_{a_4}, m_{a_5}, \ldots>$, where $m_{a_i}$ represents the execution of a module. A sequential pair of elements (vis. $<m_{a_1}, m_{a_2}>$) from this sequence represents a transition. From a nomenclature standpoint, let $t_{a_1 a_2} = <m_{a_1}, m_{a_2}>$ represent the transition from component $m_{a_1}$ to component $m_{a_2}$. For each of these transition events that occur within the nominal operation of the system, this transition is recorded in an event transition matrix E for the system. This event transition matrix is a square matrix with dimensionality equal to the number of modules in the system. For each epoch, there will be exactly one transition. If the matrix $E^{(n)}$ represents the event transition matrix on the $n^{th}$ epoch, then $E^{(n)}$ may be derived from $E^{(n-1)}$ by the change in one element $e_{a_1 a_2}^{(n)} = e_{a_1 a_2}^{(n-1)} + 1$ for the transition $t_{a_1 a_2}$.

$$E = \begin{pmatrix} e_{11} & \cdots & e_{1n} \\ \vdots & \ddots & \vdots \\ e_{n1} & \cdots & e_{nn} \end{pmatrix}$$

The steady state event activity for each event in the system is represented by one row in the matrix $$m_{\bullet j} = \sum_{i=1}^{n} m_{ij}$$

Let $$m_{\bullet \bullet} = \sum_{j=1}^{n} m_{\bullet j}.$$

represent the row marginal for the $j^{th}$ module and $$M = \lim_{a \to \infty} E^{(a)}.$$

Point estimates for the module transition profiles $p_j = <p_{1j}, p_{1j}, \ldots, p_{1j}>$ for each system event may be derived from the steady state system activity matrix by Equation (1) as follows: $p_{ij} = m_{ij}/m_{\bullet j}$. Further, point estimates for the execution profiles may be derived as follows: $p_i = m_i/m_{\bullet \bullet}$.

The real question now is whether a new sequence $m' = <m'_{a_1}, m'_{a_2}, m'_{a_3}, m'_{a_4}, m'_{a_5}, \ldots>$ of observed system activity is really equivalent to the steady state system activity or whether this is new (aberrant) behavior on the part of some user of the system. If, in fact, the new sequence m' is typical of system behavior, then there should be no essential differences between the expected distribution of m' and the actual sequence.

Let the sequence m' of b elements represent the activity of the n program modules during a particular interval. From this sequence, a new matrix $E^{(b)}$ may be derived whose elements are determined in the same manner as matrix M, except for the fact that they only represent the activity of the system during the interval of k observations of the sequence m'. Let $$m'_{\bullet j} = \sum_{i=1}^{n} m'_{ij}$$

represent the row marginal, as above, for the $j^{th}$ event in the new sequence.

The real question is whether the new sequence m' is drawn from the same population of the nominal behavior represented by the matrix M, or whether it represents abnormal behavior. This conjecture may be tested directly from:

$$\sum_{i=1}^{n} \frac{(m'_{\bullet i} - m'_{\bullet} p_i)^2}{m'_{\bullet} p_i} < \chi_\gamma^2$$

where $p_n = 1 - p_1 - \ldots p_{n-1}$ and $X_\gamma^2$ is the 100γ% point of the Chi-square distribution with n−1 degrees of freedom.

In summary, when a user is exercising a system, the software will be driven through a sequence of transitions from one module to the next, $S = <m_{ab}, m_{bc}, m_{cd}, \ldots>$, where $m_{ab}$ represents a transition from module a to module b. Over a fixed number of epochs, each progressive sequence will exhibit a particular execution profile. It represents a sample drawn from a pool of nominal system behavior. Thus, the series of sequences $S = <S_i, S_{i+1}, S_{i+2}, \ldots>$ above will generate a family of execution profiles $<p_i, p_{i+1}, p_{i+2}, \ldots>$. What becomes clear after a period of observation is that the range of behavior exhibited by a system and expressed in sequences of execution profiles is highly constrained. There are certain standard behaviors that are demonstrated by the system during its normal operation. The activities of an intruder will create significant disturbances in the nominal system behavior.

The whole notion of intrusion detection would be greatly facilitated if the functionalities of the system were known and well defined. It would also be very convenient if there were a precise description of the set of operations for the software. Indeed, if these elements of software behavior were known and precisely specified, the likelihood of security leaks in the system would diminish greatly. In the absence of these specifications, it will be assumed that neither the operational profiles nor the functional profiles can be observed directly. Instead, the distribution of activity among the program modules must be observed in order to make inferences about the behavior of the system.

The present invention, then, represents a new real-time approach to detect aberrant modes of system behavior induced by abnormal and unauthorized system activities. Within the category of aberrant behavior, there are two distinct types of problems. First, a user may be executing a legitimate system operation (technically an operation $o \epsilon O_E$) for which he is not authorized. Second, a user (hacker) could be exploiting his knowledge of the implicit operations of the system by executing an operation $o \epsilon O_I$. Each of these two different types of activities will create a distinct and observable change in the state of the software system and its nominal activity. Violations in the security of the system will result in behavior that is outside the normal activity of the system and thus result in a perturbation in the normal profiles. These violations are detected by the analysis of the profiles generated from an instrumented software system against of set of known intrusion profiles.

It is important to note that the present invention is broadly applicable to almost any type of software and can monitor activity occurring in any application or operating system to detect anomalies indicative of intrusive behavior. Prior art intrusion detection systems generally monitor events from the outside in and thus, can overlook an intrusion because they do not respond to variations in software internal activity that is not logged. In contrast, the present invention operates in real time, from within the application being monitored, and is able to respond to subtle changes that occur as a result of an intrusion. Furthermore, since the present invention can be applied to any type of computational activity, it can be used to monitor almost any type of software system and detect intrusions, for example, in software running a web server, or in database management systems, or operating system shells, or file management systems. Any software that may impacted by deliberate misuse may be instrumented and monitored with the present invention to detect such misuse or intrusion.

Computer System Suitable for Implementing the Present Invention

Figure 9:
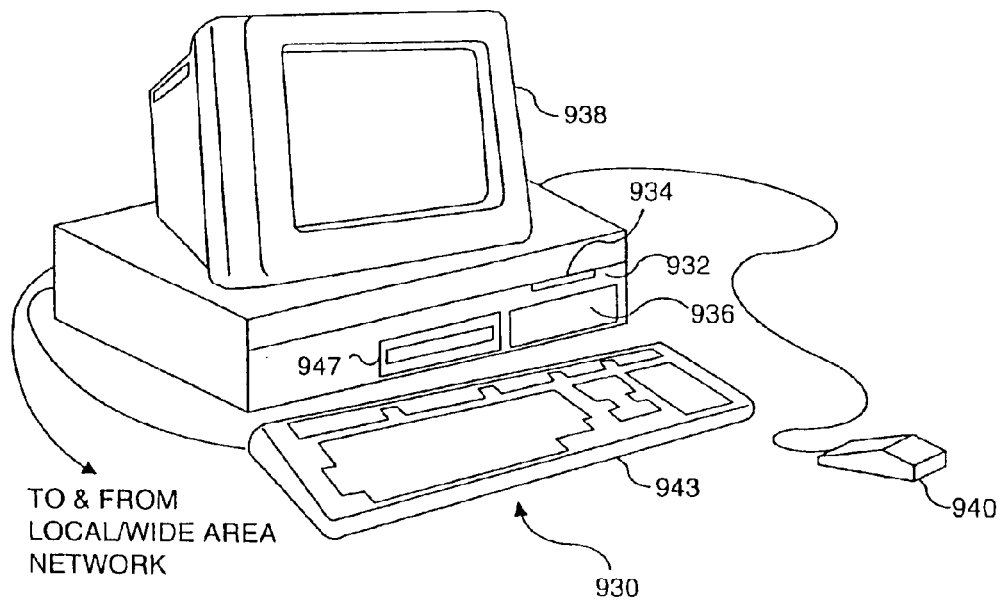
FIG. 9 is an isometric view of a generally conventional computer system suitable for implementing the present invention.

With reference to FIG. 9, a generally conventional computer 930 is illustrated, which is suitable for use in connection with practicing the present invention. Alternatively, a workstation, laptop, distributed systems environment, or other type of computational system may instead be used. Computer 930 includes a processor chassis 932 in which are optionally mounted a floppy or other removable media disk drive 934, a hard drive 936, a motherboard populated with appropriate integrated circuits (not shown), and a power supply (also not shown). A monitor 938 (or other display device) is included for displaying graphics and text generated by software programs, and more specifically, for alarm levels of the present invention. A mouse 940 (or other pointing device) is connected to a serial port (or to a bus port) on the rear of processor chassis 932, and signals from mouse 940 are conveyed to the motherboard to control a cursor on the display and to select text, menu options, and graphic components displayed on monitor 938 in response to software programs executing on the computer, including any program implementing the present invention. In addition, a keyboard 943 is coupled to the motherboard for entry of text and commands that affect the running of software programs executing on the computer.

Computer 930 also optionally includes a compact disk-read only memory (CD-ROM) drive 947 into which a CD-ROM disk may be inserted so that executable files and data on the disk can be read for transfer into the memory and/or into storage on hard drive 936 of computer 930. Other types of data storage devices (not shown), such as a DVD drive or other optical/magnetic media drive, may be included in addition to, or as an alternative to the CD-ROM drive. Computer 930 is preferably coupled to a local area and/or wide area network and is one of a plurality of such computers on the network.

Figure 10:
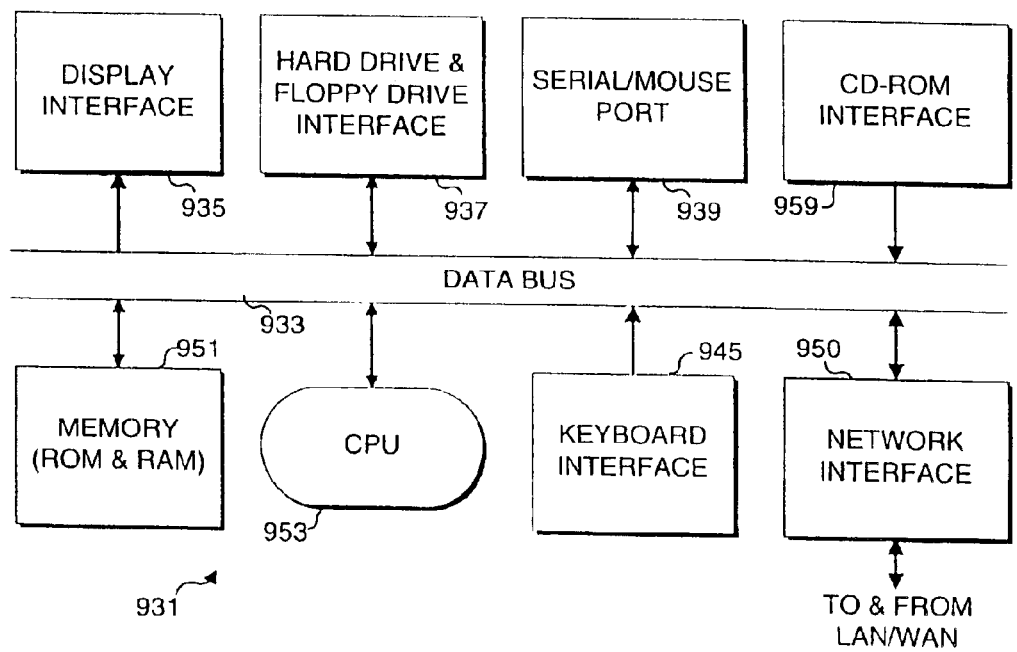
FIG. 10 is block diagram showing internal components of the computer system of FIG. 9.

Although details relating to all of the components mounted on the motherboard or otherwise installed inside processor chassis 932 are not illustrated, FIG. 10 is a block diagram illustrating some of the functional components that are included. The motherboard includes a data bus 933 to which these functional components are electrically connected. A display interface 935, comprising a video card, for example, generates signals in response to instructions executed by a central processing unit (CPU) 953 that are transmitted to monitor 938 so that graphics and text are displayed on the monitor. A hard drive/floppy drive interface 937 is coupled to data bus 933 to enable bi-directional flow of data and instructions between data bus 933 and floppy drive 934 or hard drive 936. Software programs executed by CPU 953 are typically stored on either hard drive 936, or on a CD-ROM, DVD, other optical/magnetic high capacity storage media, or a floppy disk (not shown). Alternatively, the programs may be stored on a server, e.g., if the computer comprises a workstation. A software program including machine language instructions that cause the CPU to implement the present invention will likely be distributed either on conventional magnetic storage media, on-line via, or on a CD-ROM or other optical/magnetic media.

A serial/mouse port 939 (representative of the two serial ports typically provided) is also bi-directionally coupled to data bus 933, enabling signals developed by mouse 940 to be conveyed through the data bus to CPU 953. A CD-ROM interface 959 connects CD-ROM drive 947 (or other storage device) to data bus 933. The CD-ROM interface may be a small computer systems interface (SCSI) type interface or other interface appropriate for connection to and operation of CD-ROM drive 947. A keyboard interface 945 receives signals from keyboard 943, coupling the signals to data bus 933 for transmission to CPU 953. Optionally coupled to data bus 933 is a network interface 950 (which may comprise, for example, an Ethernet™ card for coupling the computer to a local area and/or wide area network). Thus, data used in connection with the present invention may optionally be stored on a remote server and transferred to computer 930 over the network to implement the present invention.

When a software program is executed by CPU 953, the machine instructions comprising the program that are stored on removable media, such as a CD-ROM, a server (not shown), or on hard drive 936 are transferred into a memory 951 via data bus 933. Machine instructions comprising the software program are executed by CPU 953, causing it to implement functions as described above while running a computer program. Memory 951 includes both a nonvolatile read only memory (ROM) in which machine instructions used for booting up computer 930 are stored, and a random access memory (RAM) in which machine instructions and data are temporarily stored when executing application programs, such as a database program using the present invention.

Although the present invention has been described in connection with the preferred form of practicing it and modifications to that preferred form, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A method of detecting an anomalous operation of a computer system indicative of a security violation, the method comprising:
    (a) monitoring transitions across defined points within software executing on the computer system and in response thereto producing given program activity data;
    (b) comparing the given program activity data with data indicative of a normal operation of the computer system to detect an anomalous operation of the computer system indicative of a security violation; and
    (c) as a result of the comparison that detects the anomalous operation, taking a given action.

2. The method as described in claim 1 wherein the given action includes outputting a given notification.

3. The method as described in claim 2 wherein the given notification indicates an anomalous operation of the computer system.

4. The method as described in claim 1 wherein the given action includes updating data indicative of a normal operation of the software.

5. The method as described in claim 1 wherein the defined points within the software comprise program module input or output events.

6. The method as described in claim 1 wherein step (b) occurs at a given rate.

7. The method as described in claim 6 further including the step of adjusting the given rate.

8. The method as described in claim 7 wherein the given rate is increased during a given period of activity of the computer system.

9. The method as described in claim 7 wherein the given rate is decreased during a given period of activity of the computer system.

10. The method as described in claim 1 wherein the given action outputs a first indication if the comparison is indicative of an event that has been previously observed, and the given action outputs a second indication if the comparison is indicative of an event that has not been previously observed.

11. The method as described in claim 10 further including the step of forwarding data about the event that has not been previously observed for subsequent characterization.

12. The method as described in claim 1 further including the step of selectively displaying the given program activity data.

13. In a computer system comprising given hardware and software, the improvement comprising:

a transducer instrumented within the given hardware or the given software of the computer system that monitors the computer system as the computer system operates and in response thereto generates given program activity data;

a comparator that compares the given program activity data with data indicative of a normal operation of the computer system; and a device for outputting a given indication based on the comparison between the given program activity data and the data indicative of the normal operation of the computer system;

wherein the given indication is indicative of an anomalous behavior resulting from a security violation in the computer system.

14. In the computer system as described in claim 13 wherein the transducer is given code that monitors transitions across defined points within the operating environment of the computer system.

15. In the computer system as described in claim 14 wherein the defined points within the operating environment of the computer system comprise program module input or output events.

16. In the computer system as described in claim 13 wherein the transducer obtains signals indicative of the operating environment of the computer system from a hardware bus.

17. In the computer system as described in claim 13 further including code for selectively adjusting a rate at which the comparator compares the given program activity data with data indicative of the normal operation of the computer system.

18. In the computer system as described in claim 13 further including a display for outputting the given program activity data.

19. In the computer system as described in claim 13 further including code for updating the data indicative of the normal operation of the computer system.

20. A computer system, comprising:

given hardware;

given software executable on the given hardware;

a transducer instrumented within the given hardware or the given software that monitors an operating environment of the computer system as the computer system operates and in response thereto generates given program execution trace data;

a comparator that compares the given program execution trace data with data indicative of a normal operation of the computer system; and a device for outputting a given indication based on the comparison between the given program execution trace data and the data indicative of the normal operation of the computer system;

wherein the given indication is indicative of an anomalous behavior resulting from a security violation in the computer system.

21. A method of determining whether an intrusion has occurred at a given computer system having given hardware and given software, comprising:

instrumenting the given hardware or the given software;

instrumented hardware or software, monitoring an operating environment of the computer system as the computer system operates and in response thereto generating given program execution trace data;

comparing the given program execution trace data with data indicative of a normal operation of the computer system to determine whether an intrusion has occurred; and based on the comparison that determines that an intrusion has occurred, taking a given action.

22. The method as described in claim 21 wherein the monitoring step is performed remotely from the computer system.

23. The method as described in claim 21 wherein the given action outputs an alarm.

24. The method as described in claim 21 wherein the given action updates the data indicative of the normal operation of the computer system.

25. The method as described in claim 21 further including the step of adjusting a rate at which the program execution trace data is compared with the data indicative of the nominal operation of the computer system as a function of an amount of processing activity taking place at the given computer system.

26. A method of detecting an anomalous operation of a computer system, indicative of a security violation, comprising:

establishing a steady state behavior of the computer system based on at least one execution profile;

comparing internally observable execution behavior of the computer system against the steady state behavior to detect an anomalous operation of the computer system indicative of the security violation, the internally observable execution behavior defined by program activity; and taking a given action as a result of the comparison that detects the anomalous operation.

27. The method as described in claim 26 further including the step of adjusting a given rate of the comparison as a function of an amount of processing activity occurring in the computer system.

28. The method as described in claim 26 wherein the given action outputs an alarm.

29. The method as described in claim 28 wherein the alarm is indicative of an anomaly.

30. The method as described in claim 26 further including the step of recording the internally observable execution behavior of the computer system.

31. A method of detecting an anomalous operation of a computer system indicative of a security violation, comprising the unordered steps:

instrumenting given hardware or software in the computer system;

establishing a steady state behavior of the computer system based on at least one execution profile;

comparing a first behavior, as determined using program activity data generated from the instrumented hardware or software, against the steady state behavior to detect an anomalous operation of the computer system indicative of a security violation; and taking a given action as a result of the comparison that indicates the anomalous operation.

* * * * *